H. Fenton.
Towing.
No. 48,541. Patented July 4, 1865.
Fig. 1.
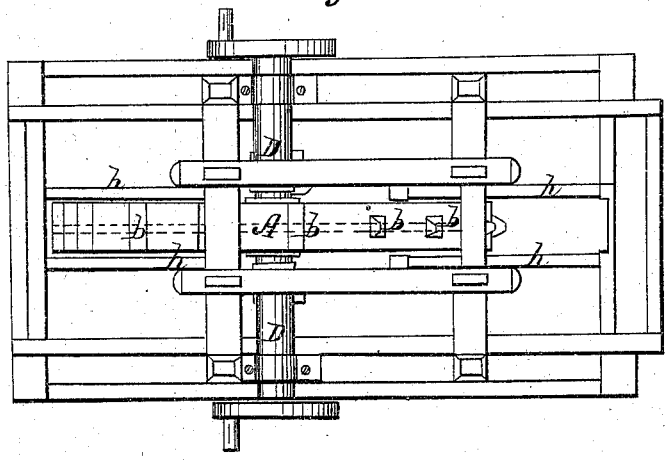
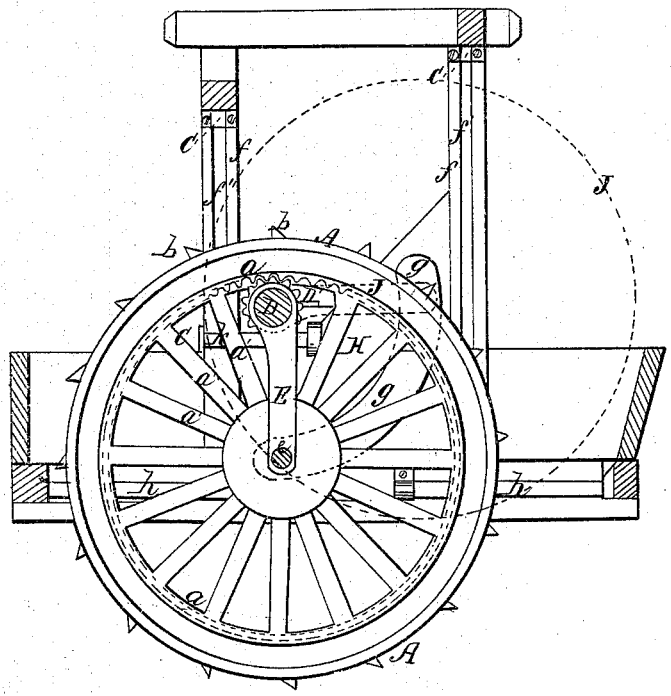
Fig. 2.
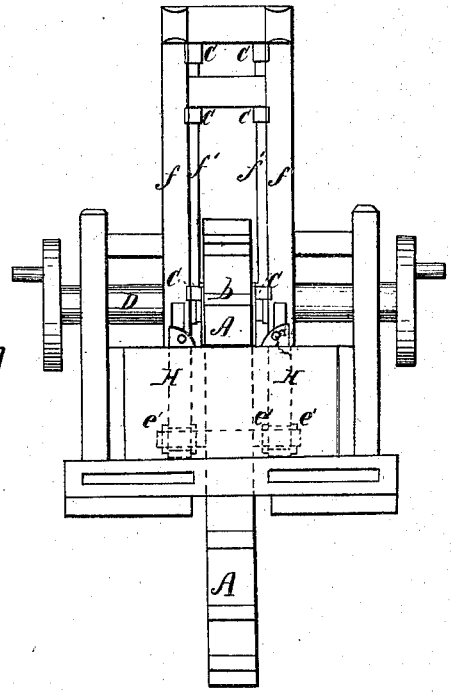
Fig. 3.
Witnesses.
W. H. Burridge
A. W. McClelland
Inventor.
Horace Fenton

UNITED STATES PATENT OFFICE.

HORACE FENTON, OF CLEVELAND, OHIO.

IMPROVED PROPELLING-WHEEL FOR RIVER AND CANAL BOATS.

Specification forming part of Letters Patent No. 48,541, dated July 4, 1865.

*To all whom it may concern:*

Be it known that I, H. FENTON, of Cleveland, in the county of Cuyahoga and State of Ohio, have invented certain new and useful Improvements in an Apparatus for Propelling Boats, &c.; and I do hereby declare that the following is a full and complete description of the construction and operation of the same, reference being had to the accompanying drawings, making a part of this specification, in which—

Figure 1 is a plan view of the apparatus. Fig. 2 is a side view with part of the frame removed to show the wheel and its connections. Fig. 3 is an end view.

Like letters of reference refer to like parts in the different views.

My improvement relates to an apparatus for propelling boats, whereby the wheel adjusts itself to the depth of water through which the boat is passing, whether deep or shallow.

A represents the propelling-wheel, with teeth or projections b, of any desired form, round on the outside of the rim, and on the inside is secured cog-wheels C, as shown in Fig. 2, and indicated by the dotted lines in Fig. 1. The wheels are separated by the part a of the rim between them, in which the spokes a' of the wheel are secured.

On the shaft D are pinions D', that work in the gear-wheels C, as represented. The shaft D, supported in the frame, is connected to the engine or other motive power by which the wheel is revolved. On the shaft outside of the pinions are hung arms E, the lower ends of which are on the shaft e of the wheel, as shown in Fig. 2. On the shaft, outside of the arms, are friction-collars, as indicated by the dotted lines e' in Fig. 3, that extend through circular slots g in pieces H connected to the frame. The collars keep the shaft in place and cause it to move easily, without friction, in the slots as the position of the wheel may be changed. The curve of the slots is described from the center of the driving-shaft, so that the wheel can swing round as it revolves up into the position indicated by the dotted lines J, or down, as shown in the drawings, or at any intermediate point, revolving with equal facility in any position, being turned by the gears C and pinions D'.

On the inside of the upright pieces f of the frame, on each side of the wheel, are rollers f', turning in boxes c above and below. There are also similar rollers, h and k, on the frame below, in the other direction from the rollers f, as seen in Fig. 2, on both sides of the wheel. The object of these friction-rollers (as the adjustable wheel A may move or be swayed against them more or less) is to facilitate the motion of the wheel, both in its revolutions and in changing its position. This wheel, as constructed and arranged, will be raised up or down, according to the varied depth of the water, being principally designed for creeks or shallow water, where horses are now used to draw the boat.

What I claim as my improvement, and desire to secure by Letters Patent, is—

The adjustable wheel A, arms E, and slots g, in combination with gearings C D and friction-rollers, when arranged and operating conjointly, substantially as and for the purpose set forth.

HORACE FENTON.

Witnesses:
W. H. BURRIDGE,
A. W. MCCLELLAND.